United States Patent [19]

Kim

[11] Patent Number: 5,359,582
[45] Date of Patent: Oct. 25, 1994

[54] SUBCODE READING APPARATUS FOR A COMPACT DISC PLAYER

[75] Inventor: Dae Y. Kim, Seoul, Rep. of Korea

[73] Assignee: Goldstar Co., Ltd., Seoul, Rep. of Korea

[21] Appl. No.: 998,578

[22] Filed: Dec. 28, 1992

[30] Foreign Application Priority Data

Dec. 28, 1991 [KR] Rep. of Korea .................. 91-24908

[51] Int. Cl.⁵ ............................................ G11B 20/10
[52] U.S. Cl. .................................. 369/47; 369/59; 369/32; 369/124
[58] Field of Search .................. 369/47, 48, 59, 32, 369/124

[56] References Cited

U.S. PATENT DOCUMENTS 4,501,000  2/1985  Immink et al. ............... 369/59 X
4,932,018  6/1990  Nagasawa et al. ............ 369/59

*Primary Examiner*—Aristotelis Psitos
*Assistant Examiner*—Duncan Wilkinson
*Attorney, Agent, or Firm*—Poms, Smith, Lande & Rose

[57] ABSTRACT

A subcode reading apparatus for a compact disc player, designed to automatically read subcode data recorded on a compact disc without depending on a system controller, which includes a timing control circuit for storing in a memory the subcode data of successive blocks outputted from a CD digital signal processing circuit according to a command signal from the system controller. According to the present invention, the efficiency of the system controller can be increased and the overall construction of the system may be simplified.

6 Claims, 5 Drawing Sheets

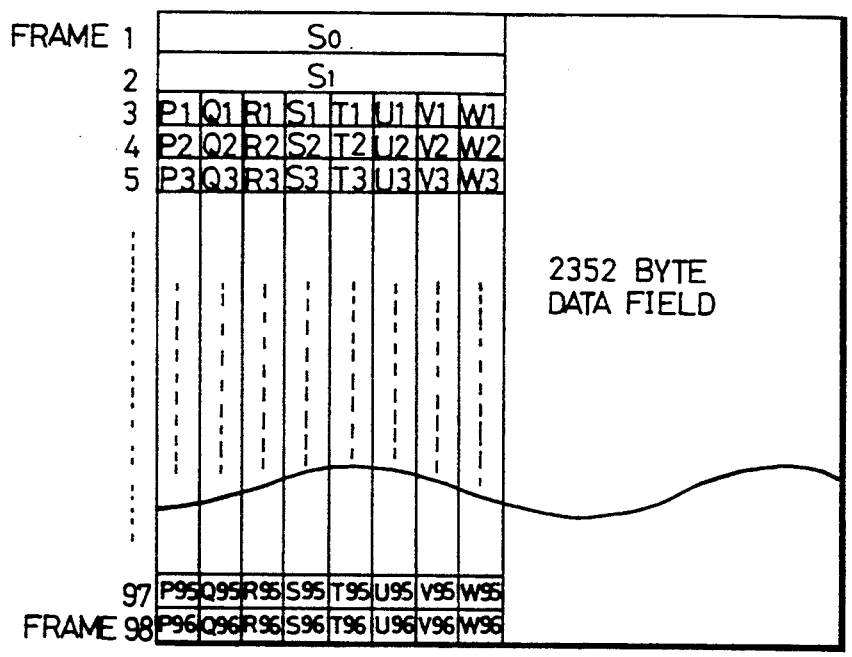
FIG. 1
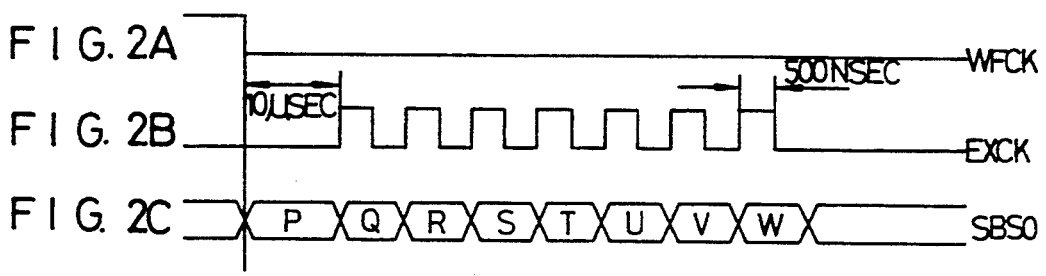
FIG. 2A
FIG. 2B
FIG. 2C

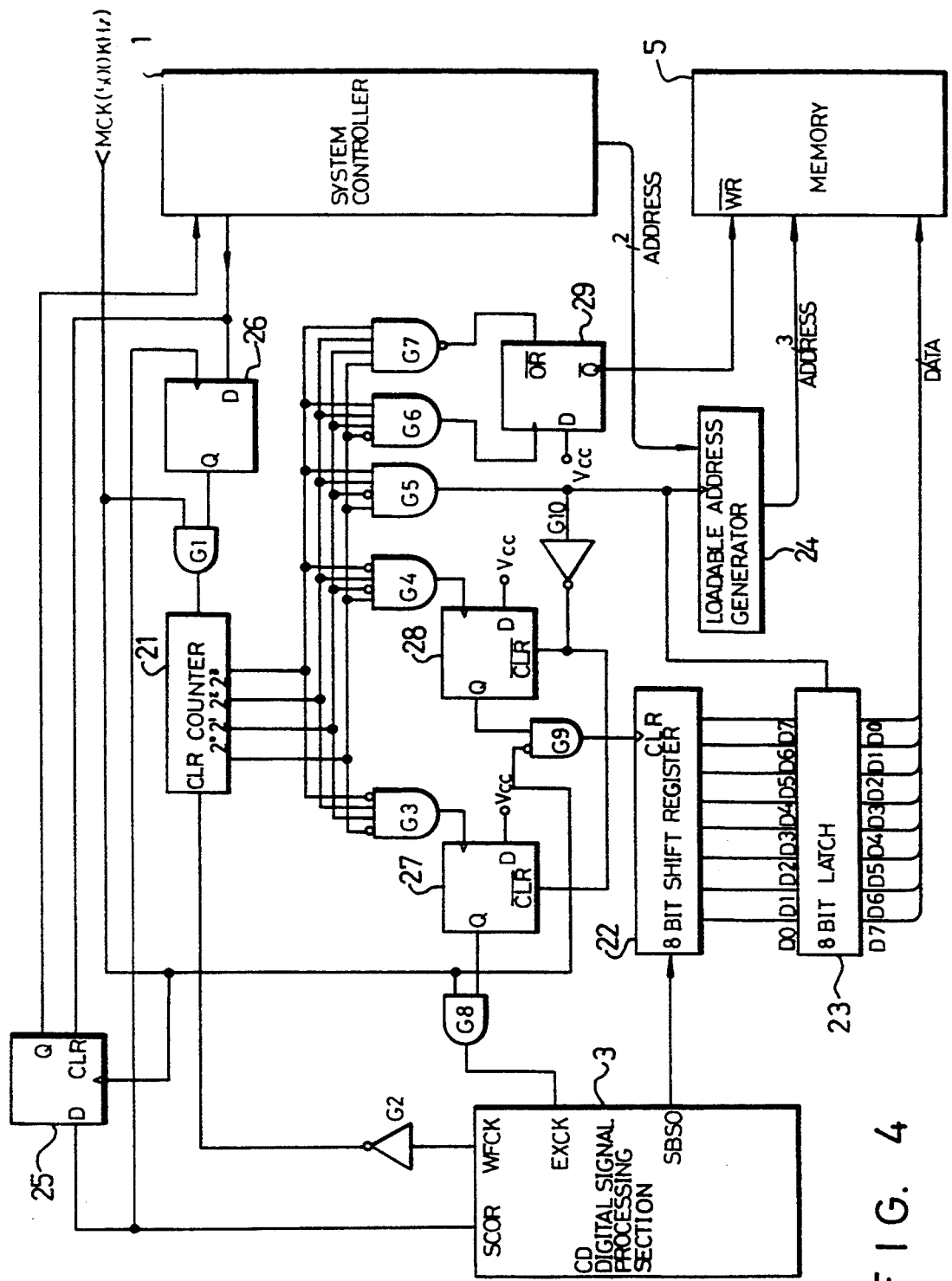
F I G. 4

SUBCODE READING APPARATUS FOR A COMPACT DISC PLAYER

BACKGROUND OF THE INVENTION

The present invention relates to an automatic subcode reading apparatus for a compact disc player, and more particularly to a subcode reading apparatus which can automatically read subcode data recorded on a compact disc without depending on a system controller.

DESCRIPTION OF THE PRIOR ART

Compact disc players, compact disc graphics and compact disc read only memories (CD-ROMs) are all types of reproducing apparatus utilizing a compact disc (CD) as recording media. The data format used in such reproducing apparatus takes form as shown in FIG. 1, in which a data field called a subcode is an important data region in which time information of the disc, the number of tunes, the number of audio channels, tone quality information, program data, graphic data, etc., can be recorded.

Referring to FIG. 1, one block (1/75 sec ≈ 13.3 msec) of data is composed of 96 bytes and a byte is composed of 8 code bits P, Q, R, S, T, U, V and W. The period for a byte is called a frame (1/75 sec × 1/98 ≈ 136 μsec) and thus one data block is composed of 98 frames.

In order to distinguish the leading part of each clock, there is provided block synchronizing data S0 and S1 with 2 bytes, and a CD digital signal processing circuit produces a synchronizing signal SCOR according to the block synchronizing data S0 and S1.

In the conventional CD player, a microprocessor, as a system controller, directly processes subcode data. That is, the microprocessor produces a frame-writing clock WFCK as shown in FIG. 2A and a clock EXCK for outputting the subcode as shown in FIG. 2B in order to read the subcode data SBSO as shown in FIG. 2 from the CD digital signal processing circuit and store the data in a memory.

According, a high-speed (i.e., several tens of MHZ or more) microprocessor is required as a system controller.

Otherwise, the microprocessor can read just one bit subcode (for example, the Q code) among the subcode data P, Q, R, S, T, V and W.

Further, the conventional CD player suffers from a disadvantage in that, to read the subcode, the microprocessor should be continuously engaged to do so and thus cannot perform other work while reading the subcode. Also, separate logic circuits are required to detect and process the synchronizing signal or the frame-writing clock outputted from the CD digital signal processing circuit.

SUMMARY OF THE INVENTION

It is an object of the present invention to provide a subcode reading apparatus for a compact disc player which can automatically read and store subcode data according to a simple command signal from the system controller, thereby maximizing the efficiency of the system controller, and which can successively process several tens of subcode data blocks without error as well as simplifying the overall construction of the system.

In order to achieve the above object, there is provided a subcode reading apparatus for a compact disc player which comprises:

control means for controlling the start and stop of processing subcode data;

compact disc digital signal processing means for separating subcode data from other data obtained from a compact disc;

a memory for storing the subcode data;

shift register means for converting the serial subcode data outputted from the compact disc digital signal processing means into data in parallel and outputting the parallel subcode data to the memory;

address generating means for assigning addresses of the memory to store the parallel subcode data in the memory; and timing control means for controlling operational timing of the compact disc digital signal processing means, the shift register means and the address generating means, respectively, to write the subcode data in memory according to commands from the control means.

BRIEF DESCRIPTION OF THE DRAWINGS

The above object and other advantages of the present invention will become more apparent by describing the preferred embodiment of the present invention with reference to the accompanying drawings, in which:

FIG. 1 is a schematic diagram explaining the subcode data format on a compact disc;

FIGS. 2A to 2C are timing charts explaining subcode data processing by the conventional method using a microprocessor;

FIG. 4 is a circuit diagram of an embodiment of the subcode reading apparatus according to the present invention;

DETAILED DESCRIPTION OF THE PREFERRED EMBODIMENT

Figure 3:
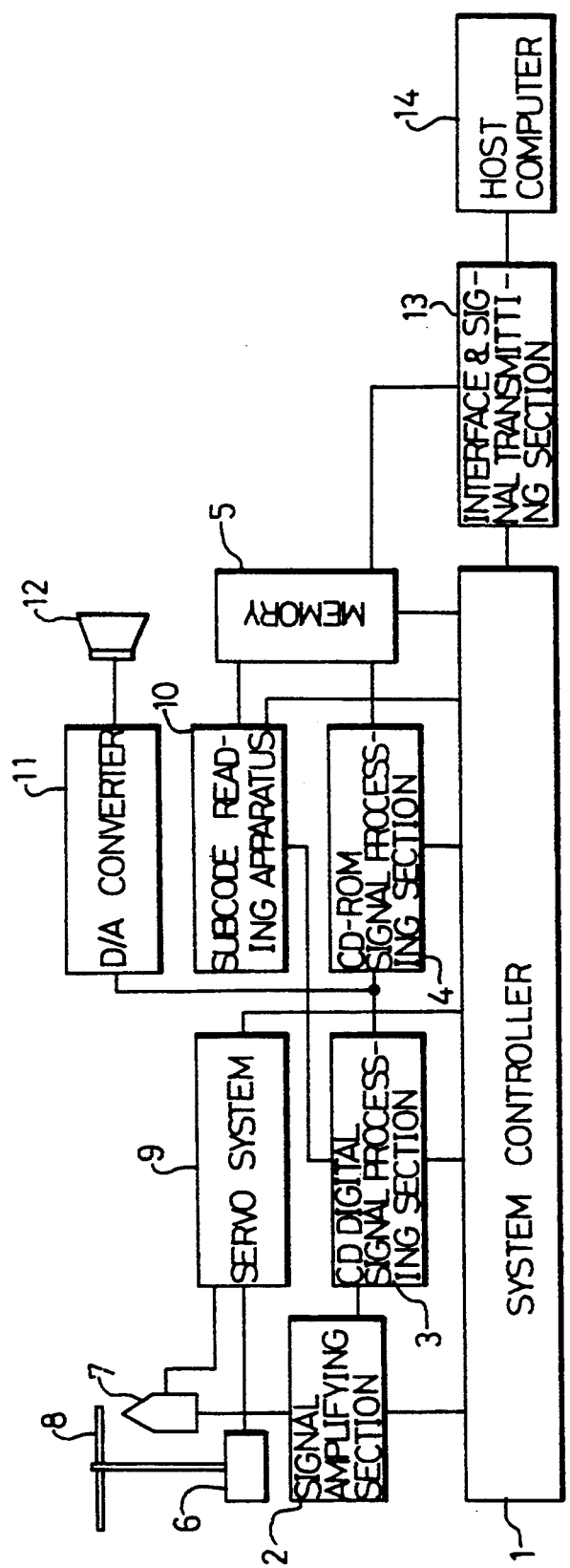
FIG. 3 is a schematic block diagram of the system in which the subcode reading apparatus according to the present invention is incorporated.

Referring to FIG. 3 showing the whole system incorporating the subcode reading apparatus according to the present invention, a system controller 1 employing a microprocessor controls the operation of a signal amplifying section 2, a CD digital signal processing section 3, a CD-ROM (Read Only Memory) signal processing section 4 and a servo system. Data recorded on a compact disc 8, which is rotated by a motor 6, is read out by an optical system 7 and is applied to the signal amplifying section 2. The amplified data are processed by the CD digital signal processing section 3 and the CD-ROM signal processing section 4 to be stored in a memory 5; and the subcode reading apparatus 10 according to the present invention reads the subcode data separated by the CD digital signal processing section 3 and stores them in the memory 5.

Meanwhile, audio signal data separated by the CD digital signal processing section 3 is converted into an analog signal by a digital/analog converting section 11 to be outputted to a speaker 12.

If required, under the control of the system controller 1, video signal data and the subcode data stored in the memory may be outputted to a host computer 14 through an interface and signal transmitting section 13 to be displayed on a video screen.

Referring to FIG. 4, the subcode reading apparatus according to the present invention includes a flip-flop 26 and an AND gate G1 which supply to a counter 21 a master clock MCK according to a synchronizing signal SCOR outputted from the CD digital signal processing section 3 and a command signal COM from the system controller 1, to start subcode data processing and 4-input AND gates G3 to G7 receiving the output of the counter 21 and outputting timing signals for arranging the timing of the subcode data outputted from the CD digital signal processing section 3.

The subcode reading apparatus also includes a flip-flop 27 and an AND gate G8 which receive the master clock MCK and the output of the AND gate G3 and outputs a first clock EXCK for outputting the subcode data SBSO from the CD digital signal processing section 3, a shift register 22 for converting the serial subcode data SBSO from the CD digital signal processing section 3 into parallel data, a latch 23 for temporarily maintaining the parallel data from the shift register 22 during writing of the data in the memory 5, and a flip-flop 28 and an AND gate G9 receiving the master clock MCK and the output of the AND gate G4 and outputting a second clock CLK to the shift register 22.

The subcode reading apparatus further includes a flip-flop 29 receiving the output of the AND gates G6 and G7 and outputting a write signal WR to the memory 5 to write the subcode data outputted from the latch 23 in the memory 5, a loadable address generator 24 for assigning addresses of the memory 5, and a flip-flop 25 receiving the synchronizing signal SCOR and outputting a report signal RP to the system controller 1 to report that subcode data per block are written.

In the embodiment, the flip-flops 25 to 29 are D-type flip-flops, and the master clock MCK has a frequency of about 500 MHz (period of 2 $\mu$sec).

Figure 5:
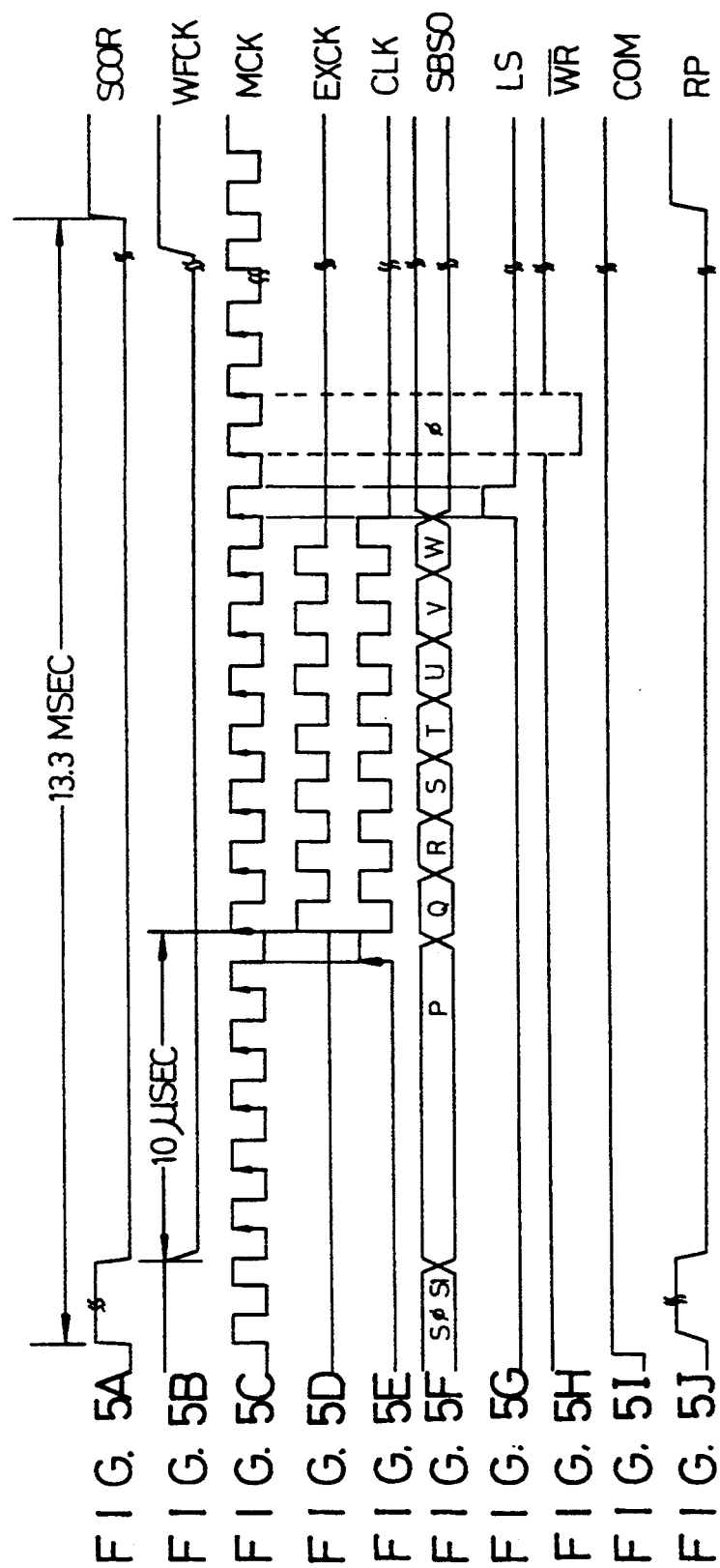
FIGS. 5A~5J are timing charts explaining the operation of the subcode reading apparatus according to the present invention.

Now, the operation and effect of the subcode reading apparatus according to the present invention constructed as mentioned above will be described in detail with reference to FIGS. 4 to 6.

System controller 1 outputs to the loadable address generator 24 addresses to be stored in the memory 5, and, afterwards, these addresses will be loaded in the loadable address generator 24 and used as leading addresses when the subcode data are written in the memory 5.

In order to read and store the subcode data in the memory 5, the system controller 1 outputs a command signal of a 'HIGH' level as shown in FIG. 5I to the input terminal D of the flip-flop 26, and the synchronizing signal of the CD digital signal processing section 3, as shown in FIG. 5A, is inputted to the clock input terminal of the flip-flop 26.

Accordingly, the output Q of the flip-flop 26 becomes 'HIGH', causing the master clock MCK (as shown in FIG. 5C) applied to one input terminal of the AND gate G1 to be inputted to the counter 21 through the AND gate G1 as a clock signal.

At the same time, according to the synchronizing signal SCOR from the CD digital signal processing section 3, a clock as shown in FIG. 5J is outputted from the output terminal of the flip-flop 25 and then inputted to the system controller 1 as a report signal, causing the system controller 1 to perceive the start of subcode reading.

Just after the synchronizing signal SCOR is outputted as mentioned above, a frame-writing clock WFCK of a 'LOW' level as shown in FIG. 5B is outputted from the CD digital signal processing section 3 and then inputted to the clear terminal of the counter 21, being inverted to a 'HIGH'-leveled signal by inverter G2. Thus, the counter 21 performs a counting operation according to the master clock MCK as shown in FIG. 5C and at the 5th rising edge of the master clock MCK, the output of the AND gate G4 becomes 'HIGH'. At this moment, the output of the AND gates G3, G5 to G7 become 'LOW', 'LOW', 'LOW' and 'HIGH', respectively. Accordingly, the master clock MCK applied to one input terminal of the AND gate G9 is applied through the AND gate G9 to the shift register 22 as a second clock CLK as shown in FIG. 5E, and therefore, one-bit P code data among the subcode data SBSO from the CD digital signal processing section 3 (as shown in FIG. 5F) is outputted and loaded to the shift register 22.

Also, at the 6th rising edge of the master clock MCK, i.e., when at least 10 $\mu$sec have elapsed after the frame-writing clock WFCK is produced as shown in FIG. 5B, the output of the AND gate G3 becomes 'HIGH'. Thus, the output Q of the flip-flop 27 also becomes 'HIGH', causing the master clock MCK applied to one input terminal of the AND gate G8 to be applied to the CD digital signal processing section 3 through the AND gate G8 as first clock EXCK as shown in FIG. 5D.

Thereafter, at every rising edge of the clock EXCK, the subcode data SBSO, i.e., the data P, Q, R, S, T, U, V and W, are outputted in due order from the CD digital signal processing section 3, and at every falling edge of the clock EXCK, the data P, Q, R, S, T, U, V and W are loaded and shifted in the 8-bit shift register 22 in due order.

At the 12th rising edge of the master clock MCK, the 7th rising edge of the clock EXCK is generated, and when the last bit data of the subcode data SBSO is outputted, the data V, U, T, S, R and Q have already been loaded in the shift register 22 in due order. Accordingly, at the 12th rising edge of the master clock MCK, one byte subcode data SBSO is completely loaded in the shift register 22.

At the 13th rising edge of the master clock MCK, the output of the AND gate G5 becomes 'HIGH' depending on the output of the counter 21 and this 'HIGH'-leveled output of the AND gate G5 is supplied to the 8-bit latch 23 as a latch signal LS, causing the latch 23 to output one byte subcode data received from the 8-bit shift register 22 to the memory 5 via a data bus.

At this time, the loadable address generator 24 increments its addresses by one and outputs the increased addresses to the memory 5.

At the same time, the 'HIGH'-leveled output of the AND gate G5 is inverted to a 'LOW'-leveled signal by an inverter G10 and then inputted to the clear terminals of the flip-flops 27 and 28. Accordingly, both the outputs Q of the flip-flops 27 and 28 and the outputs of the AND gate G8 and G9 become 'LOW' causing the first and the second clocks EXCK and CLK supplied to the CD digital signal processing section 3 and the shift register 22, respectively, to be cut off.

Thereafter, at the 14th rising edge of the master clock MCK, the output Q of the flip-flop 29 becomes 'LOW', and at the 15th rising edge of the master clock MCK, the flip-flop 29 is cleared with its output Q 'HIGH'-leveled. Thus, a write signal WR as shown in FIG. 5H is inputted to the memory 5, causing the output of the 8-bit latch 23 to be written in the memory 3.

By the above-described successive operations, one byte of subcode data is stored in the memory 5, and from the falling edge of the following frame-writing clock WFCK, such operation is repeated, causing the subcode data per byte to be stored in the memory 5 in due order. Accordingly, the subcode data of one block is completely stored in the memory 5 when such-operation is repeated 96 times.

Thereafter, the counter 21 is reset by the frame-writing clock WFCK, and the output Q of the flip-flop 8 caused by the synchronizing signal SCOR of a 'HIGH' level is inputted to the system controller 1 as a report signal RP, with the result that the system controller 1 perceives the completion of writing the subcode data of one block.

Figure 6:
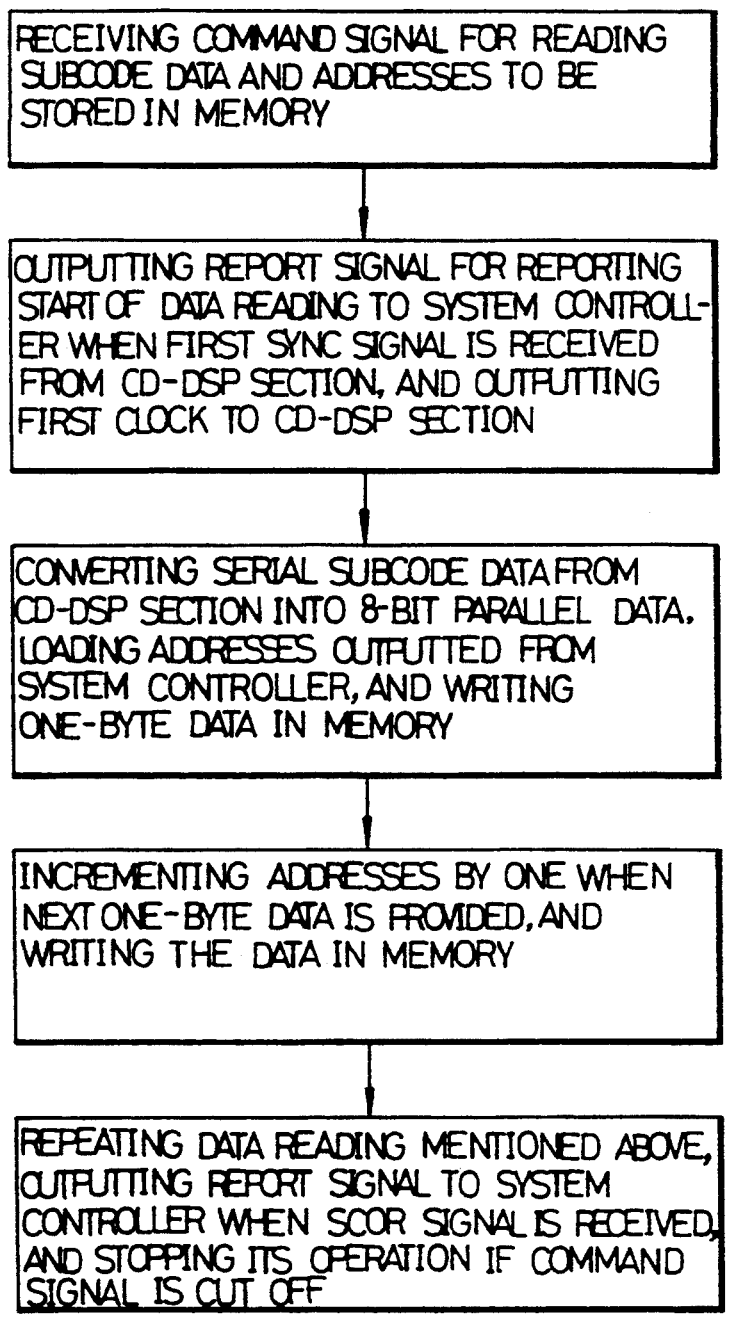
FIG. 6 is a functional flow chart depicting the function of the subcode reading apparatus according to the present invention.

FIG. 6 is a flow chart for summarily explaining the function of the subcode reading apparatus according to the present invention.

Referring to FIG. 6, the system controller 1 outputs addresses to be stored in the memory 5 and a command signal COM for data processing. The apparatus according to the present invention outputs to the system controller 1 a report signal RP reporting the start of data reading and to the CD digital signal processing (CD-DSP) section 3 a first clock EXCK when a first synchronizing signal SCOR is received from the CD-DSP section 3.

Thereafter, the present apparatus converts the serial subcode data outputted from the CD-DSP section 3 into 8-bit parallel data and stores one-byte data in the memory 5 by loading it with the addresses outputted from the system controller 1.

Also, when the next one-byte data is provided, the present apparatus increments the addresses by one and stores the data in the memory 5. While repeating such operation as mentioned above, the present apparatus reports to the system controller 1 the completion of writing the subcode data of one block if the synchronizing signal SCOR is received from the CD-DSP section 3.

Meanwhile, the system controller 1 maintains its command signal COM with a 'HIGH' level if it is required to store the subcode data of successive blocks in the memory. Otherwise, the system controller 1 makes its command signal 'LOW'-leveled to stop the subcode writing.

From the foregoing, it will be apparent that the present invention provides a novel subcode reading apparatus specially designed to automatically read and store subcode data by utilizing hardware, thereby increasing the efficiency of the system controller, and reducing the overall construction and cost of the system.

Whereas the present invention has been described in particular relation to the drawings attached hereto, it should be understood that other and further modifications, apart from those shown or suggested herein, may be made within the spirit and scope of this invention.

What is claimed is:

1. A subcode reading apparatus for a compact disc player, comprising:

means for controlling start and stop of processing subcode data;

compact disc digital signal processing means for separating said subcode data from other data obtained from a compact disc;

a memory for storing said subcode data;

shift register means for converting said subcode data in series outputted from said compact disc digital signal processing means into data in parallel and outputting said parallel subcode data to said memory;

address generating means for assigning addresses of said memory to store said subcode data in said memory; and timing control means for controlling operational timing of said compact disc digital signal processing means, said shift register means and said address generating means, respectively, to write said subcode data in said memory according to a command signal from said control means said timing control means comprising:

a first switching means for switching a master clock according to said command signal from said control means to start said subcode data processing;

a counter for counting said master clock inputted from said first switching means;

first to fifth AND gates receiving and AND-gating the outputs of said counter, respectively;

a second switching means for switching said master clock inputted to said shift register means as a shift clock according to the output of the first AND gate;

a third switching means for switching said master clock inputted to said compact disc digital signal processing means as its clock according to the output of the second AND gate;

a first flip-flop receiving the outputs of the fourth and fifth AND gates, the output of the first flip-flop being supplied to said memory as its write signal; and a first invertor for inverting the output of the third AND gate and outputting the inverted signal to the second and third switching means, respectively, as their clear signals.

2. A subcode reading apparatus as claimed in claim 1, wherein said timing control means further comprises a second flip-flop receiving a synchronizing signal from said compact disc digital signal processing means, the output of the second flip-flop being supplied to said control means as a report signal for reporting the completion of processing said subcode data of one block.

3. A subcode reading apparatus as claimed in claim 1, wherein said timing control means further comprises a second invertor for inverting a frame-writing clock from said compact disc digital signal processing means and outputting the inverted signal to said counter as its clear signal.

4. A subcode reading apparatus, as claimed in claim 1, wherein each of the first to third switching means comprises a flip-flop and a 2-input AND gate receiving said master clock as its input signal.

5. A subcode reading apparatus, as claimed in claim 1, wherein said shift register means comprises:

a shift register for converting said serial subcode data from said compact disc digital signal processing means into said parallel data according to said shift clock from said timing control means; and a latch for temporarily maintaining said parallel data from said shift register according to a latch signal from said timing control means.

6. A subcode reading apparatus for a compact disc player, said apparatus having control means digital signal processing means, memory, shift register means, and address generating means, said apparatus comprising:

timing control means for controlling operational timing of said digital signal processing means, said shift register means, and said address generating means, respectively, to write subcode data in said memory according to a command signal from said control means;

a first timing control switching means for switching a master clock according to a command signal from said control means to start subcode data processing;

a counter for counting said master clock inputted from said first timing control switching means;

first to fifth AND gates receiving and AND-gating the outputs of said counter, respectively;

a second timing control switching means for switching said master clock inputted to said shift register means as a shift clock according to the output of the first AND gate;

a third timing control switching means for switching said master clock inputted to said digital signal processing means as its clock according to the output of the second AND gate;

a first flip-flop receiving the outputs of the fourth and fifth AND gates, the output of the first flip-flop being supplied to said memory as its write signal; and a first invertor for inverting the output of the third AND gate and outputting the inverted signal to the second and third timing control switching means, respectively, as their clear signals.

* * * * *